United States Patent

Inoue et al.

Patent Number: 5,852,234
Date of Patent: Dec. 22, 1998

[54] KNOCKING DETECTING SENSOR

[75] Inventors: Nobuhiro Inoue; Sadamitsu Harada; Osamu Imamura, all of Aichi, Japan

[73] Assignee: NGK Spark Plug Co., Ltd., Aichi, Japan

[21] Appl. No.: 826,145

[22] Filed: Mar. 27, 1997

[30] Foreign Application Priority Data

Mar. 29, 1996 [JP] Japan ................................. 8-103859

[51] Int. Cl.$^6$ ........................... G01L 23/22; G01M 15/00
[52] U.S. Cl. ......................... 73/116; 73/35.07; 73/35.09
[58] Field of Search ............................. 73/35.07–35.14, 73/115, 116, 117.2, 117.3

[56] References Cited

U.S. PATENT DOCUMENTS

| | | | |
|---|---|---|---|
| 4,254,354 | 3/1981 | Keem | 73/35.11 |
| 4,374,472 | 2/1983 | Nishimura et al. | 73/35.11 |
| 4,393,688 | 7/1983 | Johnston et al. | 73/35.11 |
| 4,497,198 | 2/1985 | Takahashi et al. | 73/35.11 |
| 4,574,616 | 3/1986 | Miura et al. | 73/35.11 |
| 4,959,993 | 10/1990 | Komurasaki | 73/35.11 |

FOREIGN PATENT DOCUMENTS

| | | |
|---|---|---|
| Hei. 3-291545 | 12/1991 | Japan . |
| Hei. 4-129487 | 11/1992 | Japan . |
| Hei. 4-131729 | 12/1992 | Japan . |
| Hei. 4-131730 | 12/1992 | Japan . |
| Hei. 4-131731 | 12/1992 | Japan . |

*Primary Examiner*—George M. Dombroske
*Attorney, Agent, or Firm*—Finnegan, Henderson, Farabow, Garrett & Dunner, L.L.P.

[57] ABSTRACT

A knocking detecting sensor for detecting knocking generated in an internal combustion engine includes a vibration detecting element, a terminal, a terminal holder, a casing and a sealing member. The vibration detecting element detects vibrations due to knocking. The terminal having a first and a second ends, the first end being connected to the vibration detecting element so as to take out an output therefrom. The terminal holder integrated with the terminal so as to hold it. The casing houses the vibration detecting element and the terminal holder, the casing having a terminal through-hole for externally protruding the second end of the terminal. The sealing member is arranged so as to surround the terminal between said terminal holder and the casing to prevent fluid from leaking into the inside of the casing from the terminal through-hole. Such a sensor structure assures airtightness of the casing and easiness of wiring the detecting element to the terminal.

10 Claims, 8 Drawing Sheets

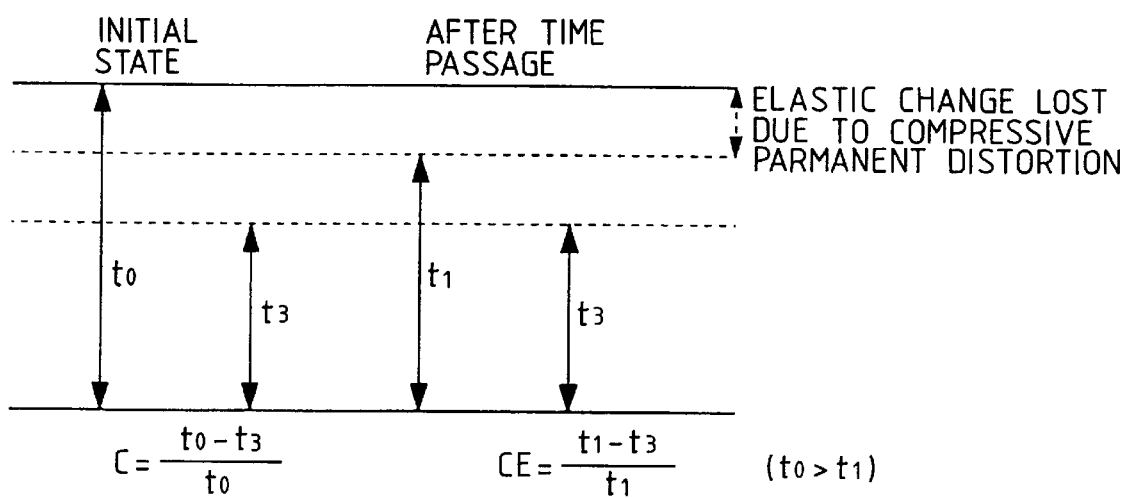

KNOCKING DETECTING SENSOR

BACKGROUND OF THE INVENTION

1. Field of the Invention

The present invention relates to a knocking sensor for detecting knocking in an internal combustion engine such as a motor vehicle engine.

2. Description of the Prior Art

Conventionally, as a knocking sensor for detecting knocking generated in an engine of a motor vehicle, for example, a knocking sensor which detects vibration due to knocking by means of a detecting element such as a piezoelectric detecting element has been used. Such a knocking sensor generally has a structure in which a thin plate-shaped piezoelectric detecting element is incorporated in a casing so that the output from the detecting element due to vibration is taken out to the outside through a terminal connected to the detecting element. In this case, it is necessary to draw out the terminal while keeping airtightness of the casing so that water and the like does not intrude into the casing. In order to attain such an object, various kinds of sensor structures have been proposed.

In the sensor structure proposed in Japanese Patent Unexamined Publication (kokai) No. Hei. 3-291545, a casing is divided into first and second sections. A detecting element is secured to the first section. A terminal passing through the second section is integrally provided therewith. The tip end portion of the terminal is wired to the detecting element by soldering. The casing is sealed by caulking both first and second sections. In this structure, however, the terminal integrated with the second section must be wired to the detecting element secured to the first section. Therefore, the casing may interfere with executing the wiring operation such as soldering.

On the other hand, in the sensor structure disclosed in Japanese Utility Model Unexamined Publication No. Hei. 4-131730, a detecting element is secured to the first section of the casing divided into two sections, and a terminal separated from the second section is previously wired to the detecting element. The terminal is passed through a through-hole formed in the second section, and the first section is covered with the second section. Both sections are integrated with each other by caulking, and resin is filled between the through-hole and the terminal. Thus, the entire casing is sealed. In this structure, the terminal can be relatively easily wired to the detecting element, but resin filling between the through-hole and terminal can not sufficiently assure the airtightness within the casing.

SUMMARY OF THE INVENTION

It is an object of the present invention is to provide a knocking sensor having a structure which can sufficiently assure airtightness of a casing and permits a vibration detecting sensor to be easily wired to a terminal.

A knocking detecting sensor for detecting knocking generated in an internal combustion engine according to the present invention includes a vibration detecting element, a terminal, a terminal holder, a casing and a sealing member. The vibration detecting element detects vibrations due to knocking. The terminal having a first and a second ends, the first end being connected to the vibration detecting element so as to take out an output therefrom. The terminal holder integrated with the terminal so as to hold it. The casing houses the vibration detecting element and the terminal holder, the casing having a terminal through-hole for externally protruding the second end of the terminal. The sealing member is arranged so as to surround the terminal between said terminal holder and the casing to prevent fluid from leaking into the inside of the casing from the terminal through-hole.

According to the present invention, such a sensor structure assures airtightness of the casing and easiness of wiring the detecting element to the terminal.

BRIEF DESCRIPTION OF THE DRAWINGS

In the accompanying drawings:

FIG. 10 is a graph showing the relationship between an initial compression ratio and a corrected compression ratio.

DETAILED DESCRIPTION OF THE INVENTION

Figure 1:
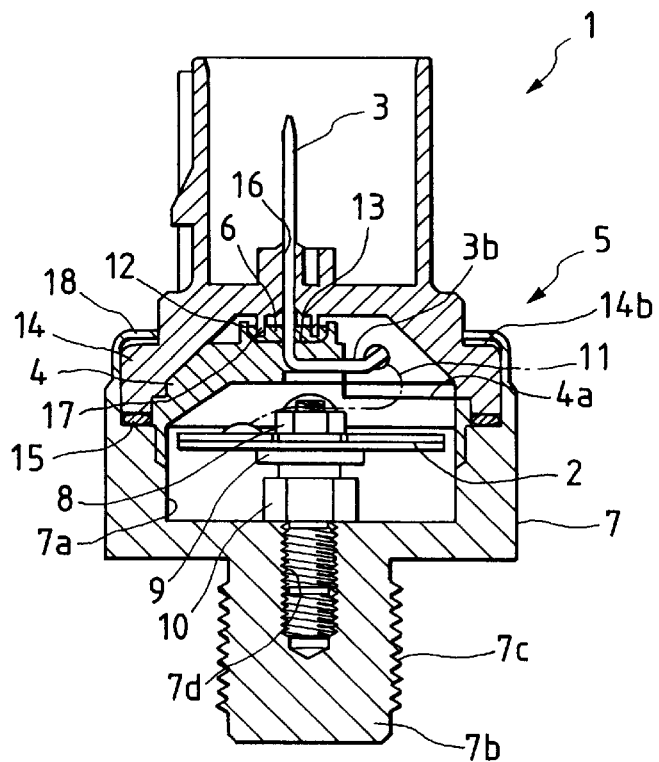
FIG. 1 is a front sectional view showing one example of the knocking detecting sensor according to the present invention.

Detailed description of the present invention will be described as follows.

The present invention provides a knocking detecting sensor for detecting knocking generated in an internal combustion engine. The knocking sensor according to the present invention includes a vibration detecting element, a terminal, a terminal holder, a casing and a sealing member. The vibration detecting element detects vibrations due to knocking. The first end side of the terminal is connected to the vibration detecting element, and the terminal takes out an output therefrom. The terminal holder is integrated with said terminal so as to hold it. The casing houses the vibration detecting element and said terminal holder, and has a terminal through-hole for externally protruding the second end side of the terminal. The sealing member is arranged to surround the terminal between the terminal holder and the casing, thereby preventing fluid from leaking into the inside of the casing from the terminal through-hole.

In accordance with this structure, since the sealing member arranged between the casing and the terminal holder integrated with the terminal stops leak of water from the terminal through-hole formed in the casing, the airtightness of the sensor is can be improved. After the terminal is wired to the vibration detecting element, it can be passed through said through-hole for assembling of the casing. The wiring between the vibration detecting element and terminal can be easily performed.

More specifically, the casing may be structured to include a first section where said vibration detecting element is secured and a second section where said terminal through-hole is formed. In this case, the vibration detecting element is secured to the first section of the casing, and one tip end portion of the terminal integrated with the terminal holder is wired and connected to the vibration detecting element. Then, while another tip end portion of the terminal is inserted into the through hole, the first section of the casing is covered with the second section thereof. Under this condition, the first and second section of the casing can be integrally joined. Thus, the wiring between the vibration detecting element and terminal can be more easily performed.

The sealing member may be a flexible elastic member which is partially compressed between the terminal holder and the casing to form a closed sealing space surrounding the terminal between the sealing member and the terminal holder or the casing. Thus, the airtightness of the sensor can be further improved.

A protruding strip is formed so as to surround the terminal through-hole in an inner surface of the casing. The protruding strip abuts on the flexible elastic member to be engaged thereinto to form the closed sealing face between it and the elastic member. In accordance with this structure, the engagement of the protruding strip into the elastic member further improves the airtightness of the sensor. The degree of engagement of the protruding strip thereinto can be easily adjusted. The compression ratio of the elastic member is adjusted to an optimum value so as to improve the airtightness of the sensor.

The flexible elastic member is preferably rubber integrated with the terminal when fluid non-hardened rubber is injected and hardened.

The flexible member is formed by injecting and hardening a fluid non-hardened rubber to be a rubber member integrally formed with the terminal. The adhesive effect between the terminal and the rubber can be obtained. Consequently, even if a gap is formed between the terminal and the terminal holder, the rubber stops leak of water into the casing from the gap because of the adhesive effect so that the airtightness of the sensor can be further improved. Such an adhesive effect is remarkable when silicon rubber is used as the rubber member. The "silicon rubber" generally refers to the synthetic rubber having a main ring of organo-siloxane coupling in its molecular structure. In the present invention, preferred examples of the silicon rubber include vinyl silicon rubber (vinyl methyl silicon rubber), phenyl silicon rubber (phenyl methyl silicon rubber) and fluoro-silicon rubber, because these materials are small in compression permanent distortion ratio to provide excellent durability and sealing property. In this case, although the silicon rubber may be hard at room temperature, it may be preferably thermosetting material to create the sealing member effectively.

The terminal holder may have a groove formed to surround the terminal on the side opposite to the internal face of the casing. The fluid non-hardened rubber is injected into the groove and hardend so that the rubber member is integrated with the terminal and the terminal holder. Thus, the sealing material can be very easily integrated with the terminal.

The rubber material used for the sealing member preferably satisfies the following condition.

(1) The rubber plate is interposed between a shielding member and a hollow cylinder in which an opening portion is formed at one end surface and the other end surface is closed so that the shielding member closes the opening portion.

(2) While the rubber plate is compressed at a prescribed compression ratio C between the shielding member and the hollow cylinder, air is introduced into the hollow cylinder with pressure of $2 kgf/cm^2$ through an air introducing passage formed in the shielding member or hollow cylinder.

The rubber used in the present invention which gives no leak of the introduced air satisfies the following condition:

$$C_{max}(1-R_p)/(1-C_{max} \times R_p) > C_{min} \tag{1}$$

where $C_{max}$ represents the maximum value of the compression ratio C with no air leak;
$C_{min}$ represents the minimum value thereof; and
$R_p$ represents the compression permanent distortion ratio of the rubber.

The compression permanent distortion ratio $R_p$ can be measured by the following method.

(3) The rubber is formed in a cylinder having a thickness of $t_0$ mm.

(4) The rubber is compressed to have a thickness $t_3$ mm.

(5) In this compressed state, the rubber is heated to 130° C. and held for 24 hours as it is. Thereafter, the rubber is cooled to room temperature and left for 30 minutes in a state with the compression released.

(6) The compression permanent distortion ratio $R_p$ when the thickness of the rubber material after release of compression and leaving is t1 can be obtained from:

$$R_p = (t_0 - t_1)/(t_0 - t_3) \tag{2}$$

An explanation regarding to the formula (1) will be given as follows.

Generally, when the rubber is left for a long time in its compressed state, because of its secular changes, a part of the compressive elastic distortion is converted into compressive permanent distortion. This is one of causes loosing the sealing property when the rubber material is used as the sealing member. The compression permanent distortion depends on the material of rubber. The compressive permanent distortion ratio $R_p$ represented by Formula (2) exhibits a tendency of generating the compressive permanent distortion in the rubber material.

On the other hand, when the rubber is used for the sealing member, there is a minimum compression ratio for assuring the sealing property. In the present invention, $C_{min}$ (hereinafter referred to as "minimum compression ratio") measured in the above Formulas (1) and (2) is uses as the index in the present invention. The sealing property increases with an increase in the compression ratio C in a prescribed range exceeding $C_{min}$. However, when C exceeds a prescribed value, the rubber is broken to thereby reduce the sealing property. The above $C_{max}$ (hereinafter referred to as "maximum compression ratio") corresponds to the compression ratio at the limit.

When the rubber material is reduced to the minimum compression ratio $C_{min}$, most of compressive distortion is elastic distortion in an initial state, thereby securing the sealing property. However, if the rubber is left in the compressed state for a long time, a part of the compression distortion is converted into permanent distortion so that the sealing property is lost. In view of this fact, the initial compression ratio is set for a larger value by the degree of possible permanent distortion. Thus, the sealing property can be still assured after secular changes of the compression ratio. Now, assuming that the compression ratio C (hereinafter referred to as "initial compression ratio") at the initial state is reduced by the degree converted in terms of the compression permanent distortion ratio $R_p$ owing to production of the permanent distortion, the compression ratio $C_E$ (hereinafter referred to as "corrected compression ratio") can be obtained as follows.

As seen from FIG. 10, when a rubber sheet having a thickness of $t_0$ in a non-compressed state is compressed to have a thickness of $t_3$ ($t_0 > t_3$), the initial compression ratio C is expressed by:

$$C = (t_0 - t_3)/t_0 \quad (3)$$

Assuming that the rubber sheet has a thickness of $t_1$ in a non-compressed state after its secular change, the corrected compression ratio $C_E$ can be expressed by:

$$C_E = (t_1 - t_3)/t_1 \quad (4)$$

Now, $t_3$ and $t_1$ satisfy the formulas of:

$$t_3 = (b - C) \times t_0 \quad (5)$$

$$t_1 = t_0 - R_p(t_0 - t_3) \quad (6)$$

Hence, from Formulas (4) to (6), the corrected compression ratio $C_E$ can be expressed by:

$$C_E = C(1 - R_p)/(1 - CR_p) \quad (7)$$

Thus, the condition for assuring the sealing property after the secular change can be expressed by:

$$C_E = C_{min} \quad (8)$$

From Formulas (7) and (8), $$C(1 - R_p)/(1 - C \times R_p) > C_{min} \quad (9)$$

That is, if the initial compression ratio C of the rubber material (i.e. sealing member) is preset so as to satisfy Formula (9), the compression ratio after its secular change (corrected compression ratio) becomes larger than the minimum compression ratio $C_{min}$, thus assuring the sealing property. Accordingly, it is desirable that the sealing member is set to have the compression ratio satisfying the formula (9) when it is incorporated in the knocking detecting sensor to maintain good sealing property for a long time.

Here, if the initial compression ratio C of the rubber material can be increased with no limit, the compression ratio can be set so as to satisfy the condition of Formula (9) by increasing C sufficiently in accordance with $R_p$. However, if the value of C is set to exceed the maximum compression ratio $C_{max}$, the rubber material is broken to thereby impair the sealing property. Accordingly, the initial compression ratio must be set in a range smaller than $C_{max}$. Thus, setting $C = C_{max}$ in Formula (9) gives the condition of Formula (1). Namely, in order to assure the sufficient sealing property after the secular change within a range generating no damage of rubber due to excessive compression, it is preferable to use the rubber material satisfying Formula (1). Additionally, the rubber material preferably has $C_{max}$ of 0.6 (60%) or larger in order to assure the durability of the sealing material, and more preferably, it has $C_{max}$ of 0.8 (80%) or larger.

When the knocking detecting sensor according to the present invention is assembled, the compression degree of the sealing member may be varied in accordance with variations in the gap created between the inner face of the casing and the terminal holder, thickness of the sealing member, depth of engagement of the protruding strip into the sealing member, etc. In this case, if the initial compression ratio C of the sealing material is set to excessively near to $C_{max}$, because of the above variations, C may exceed $C_{max}$. This may lead to destruction of the rubber material to damaging the sealing property. For this reason, the initial compression ratio C is desired to be smaller than $C_{max}$. However, if a rubber material is selected so that the difference between the value of the left side and that of the right side is too small in Formula (1), even when the initial compression ratio C is slightly smaller than $C_{max}$, owing to the above variations, the condition of Formula (9) may not be satisfied, thus damaging the sealing property of the rubber member.

In view of these facts, the inventors of the present invention found that the rubber material satisfying the condition of replacing $C_{max}$ in Formula (1) by 0.5, i.e.

$$0.5 \times (1 - R_p)/(1 - 0.5\ R_p) > C_{min} \quad (10)$$

can reduce the influence of the above variations, thus assuring the airtightness of the sensor more effectively. That is, the rubber material which can satisfy Formula (1) even when the maximum compression ratio is estimated at a value (e.g. 0.5 (50%)) lower than the actual $C_{max}$ should be selected. Thus, the possibility that C exceeds the actual $C_{max}$ because of the variations, or inversely the compression ratio after the secular change (corrected compression ratio) $C_E$ becomes lower than $C_{min}$ can be decreased, thus assuring the sealing property.

The silicon rubber satisfying the above condition is commercially available as TSE3251 from Toshiba Silicone, Co. Ltd, etc. The rubber material other than silicon rubber, e.g. several kinds of fluoro rubber (e.g. fluoro vinylidene rubber), natural rubber, chloroprene rubber, ethylene propylene rubber, etc. may be used.

An explanation will be given of various embodiments of the present invention. FIG. 1 shows a sectional structure of a knocking detecting sensor (hereinafter simply referred to as "sensor") 1 according to an embodiment of the present invention. The sensor 1 mainly includes a vibration detecting element 2, a terminal 3, a terminal holder 4, a casing 5 and a sealing member 6.

The vibration detecting element 2 has a disk shape made of piezoelectric ceramic, and housed in a groove 7a of a main metallic mount 7 constituting a lower section (first section) of the casing 5. From the center of the lower surface of the main metallic mount 7, an attaching portion 7b protrudes downward. On the outer surface of the attaching portion, a screw 7c is formed which is used to attach the sensor 1 to an engine block (not shown). At the center of the bottom of the groove 7a, a screw hole 7d to intrude in the attaching portion 7b is formed. The vibration detecting element 2 is secured to the main metallic mount 7 in such a manner that a screw 8 penetrating the center of the element 2 is screwed into the screw hole 7d. On an area of the screw 8 between the vibration detecting element 2 and the bottom of the groove 7a, a metallic washer 9 and a nut 10 are mounted which serve to position the vibration detecting element 2 at a prescribed height separate from the bottom of the groove 7a.

A metallic layer is coated on both surfaces of the vibration detecting element 2 to form electrodes. The electrode formed on the lower surface is in contact with the bottom of the groove 7a through the washer 9 and nut 10, and further grounded through the attaching portion 7b and engine block (not shown). On the other hand, the electrode formed on the upper surface is soldered to the one end of a wire 11.

Figure 2A:
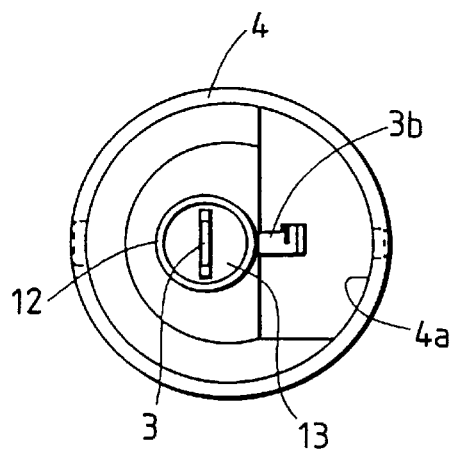
FIGS. 2A and 2B are a plan view and a front sectional view of a terminal and a terminal holder.
Figure 2B:
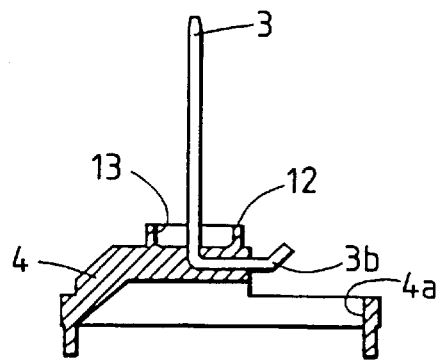

The lower end of a strip metallic member is bent to form the L-shaped terminal 3. On the other hand, as shown in FIGS. 2A and 2B, the terminal holder 4 is a plastic member injection-molded integrally with the terminal 3, and as shown in FIG. 1, is located to have a circular planar shape covering the vibration detecting element 2 from above. The terminal holder 4 is formed in an inverted-dish shape with the center swelled upwards. As seen from FIG. 2B, one side of the inverted-dish shape with respect to the terminal 3 is cut away to form a window-like opening 4a. The bending portion of the terminal 3 is integrally embedded in the top center of the inverted-dish shape. The lower end 3b of the terminal 3 bent sidewards protrudes from the side of the opening 4a into the window-like opening 4a. Further, as shown in FIG. 1, the tip of the lower end 3b of the terminal 3 is slightly bent up and soldered with the other end of the wire 11.

The upper end of the terminal 3 protrudes from the top surface of the terminal holder 4 to extend upwards. On the top surface of the terminal holder 4, an annular-shape protruding strip 12 is formed to surround the terminal 3, and the inside thereof forms a groove 13. In the groove 13, as shown in FIG. 4, silicon rubber 6a is injected to form a sealing member 6.

Figure 4A:
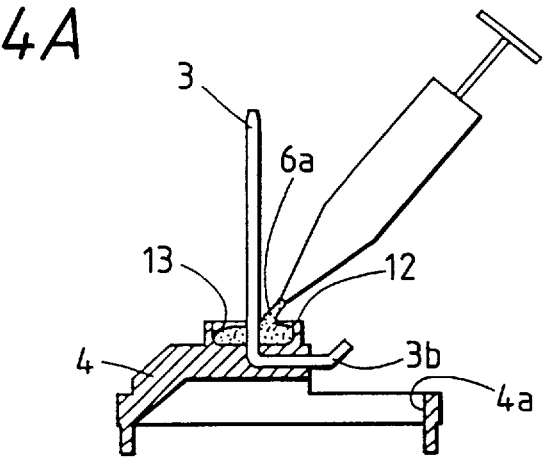
FIGS. 4A and 4B are views showing the method of forming a sealing member.
Figure 4B:
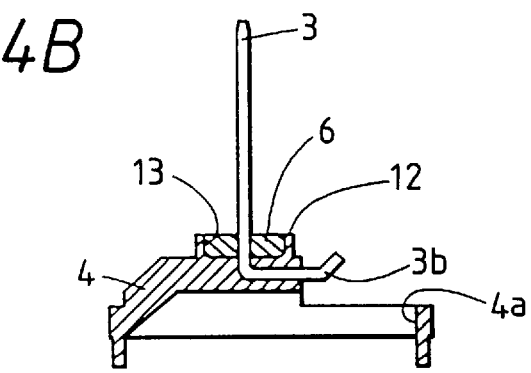

That is, as shown in FIG. 4A, fluid non-hardened silicon rubber 6a is injected into the groove 13 so that the sealing member 6 is integrally formed with the terminal 3 and the terminal holder 4. The silicon rubber 6a may be e.g. thermosetting vinyl silicon rubber or phenyl silicon rubber.

As shown in FIG. 1, the upper side of the casing 5 constitutes a cover member (second section) 14 separately provided from the main metallic mount 7. The cover member 14 is a plastic mold with a center swelling upwards so as to correspond to the terminal holder 4 and is arranged so as to cover the terminal holder 4 (and vibration detecting element 2) from above. The lower outer edge of the cover member 14 is supported by the upper outer edge of the main metal mount 7 through a sealing member 15 such as an O-ring. At the top of the cover member 14 at a position corresponding to the terminal 3, a terminal through-hole 16 is formed through which the upper end of the terminal 3 is passed and led externally from the casing 5.

Figure 3A:
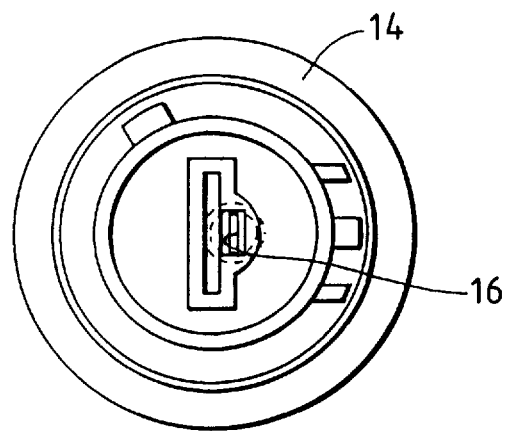
FIGS. 3A and 3B are a plan view and a front sectional view of a cover member.
Figure 3B:
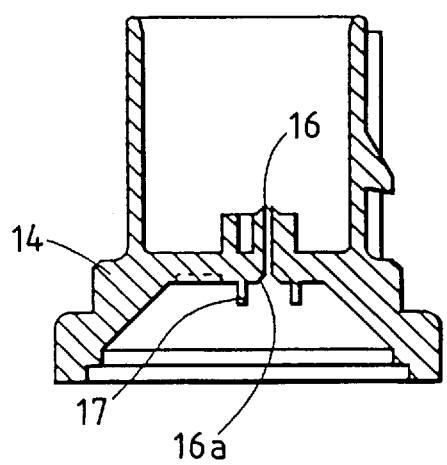

Further, as shown in FIG. 3B, on the inside of the cover member 14, an annular protruding strip 17 is formed so as to surround the terminal passing through-hole 16.

Further, as shown in FIG. 3B, an annular protruding strip 17 is formed around the terminal passing through-hole 16 at the inside surface of the cover member 14 so as to surround the terminal passing through-hole 17. The protruding strip 17 is formed to have a smaller diameter than that of the protruding strip 12 of the terminal holder 4 and also abutted in the sealing member 6 to engage therewith from above. Thus, a closed sealing space is formed to surround the terminal 3 between the protruding sealing strip 17 and the sealing member 6. Therefore, water is prevented from intruding into the inside of the casing 5 from the terminal passing through-hole 16. Incidentally, an undercut 16a for guiding the terminal is formed at the opening of the terminal passing through-hole 16 on the inside of the cover member 14.

Further, the upper side portion of a cylindrical area 18a (FIG. 5) formed over the entire periphery of the metallic mount 7 is caulked inward along the stepped face 14b at the outer edge of the cover member 14. Thus, at the upper outer edge of the main metallic mount 7, a caulking/coupling portion 18 for integrally caulking the main metallic mount 7 and the cover member 14 is formed.

An explanation will be given of the method of assembling and using the sensor 1.

Figure 5:
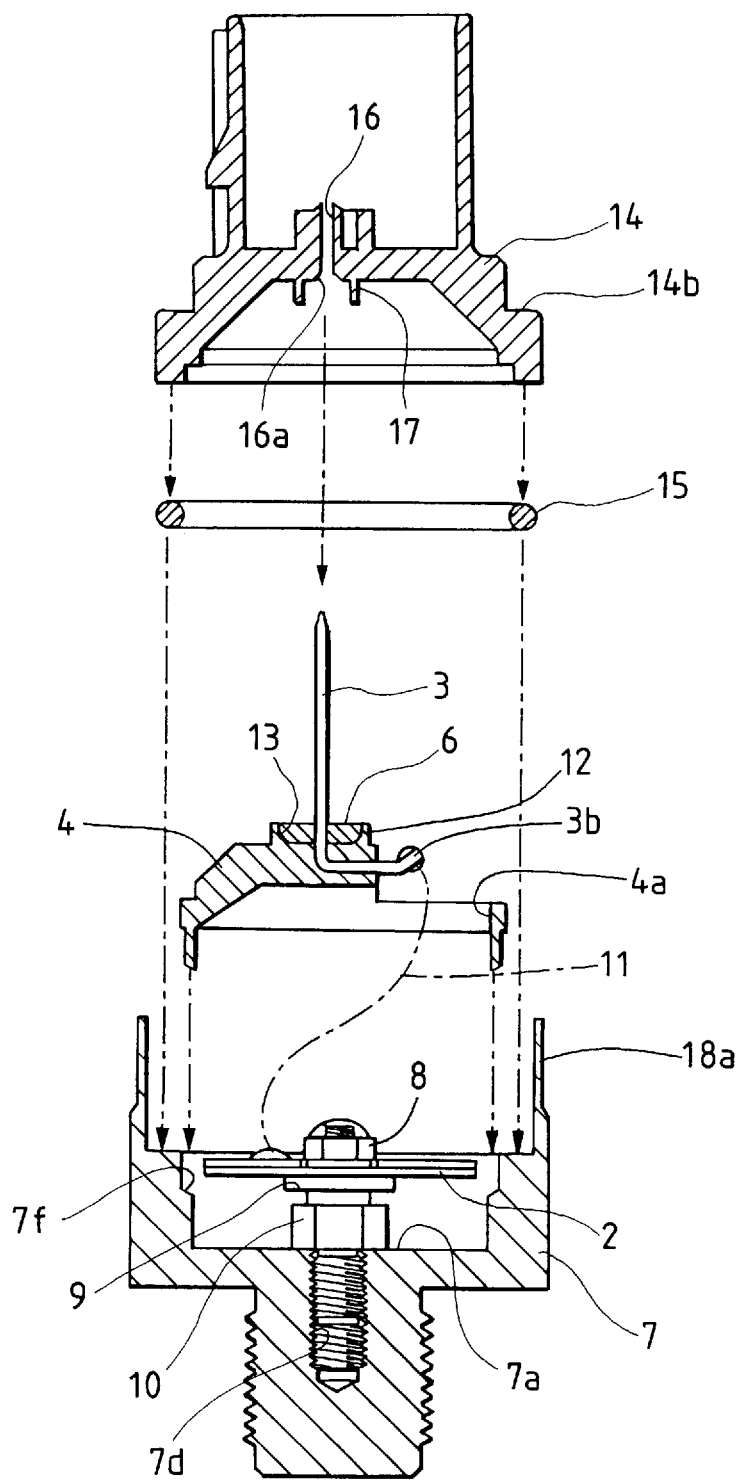
FIG. 5 is a view showing the method of assembling the sensor shown in FIG. 1.
Figure 6:
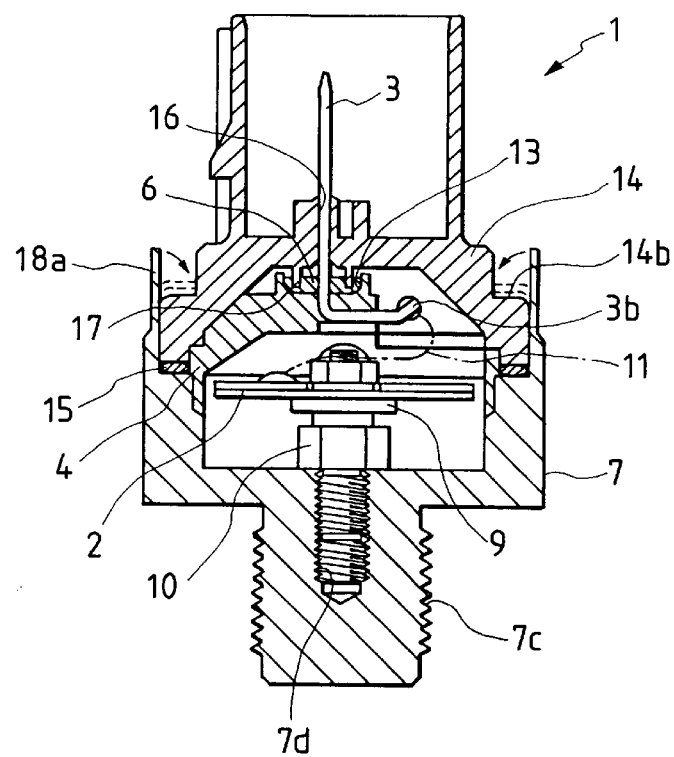
FIG. 6 is a view successive to FIG. 5.

First, as shown in FIG. 5, the vibration detecting element 2 is secured to the main metal mount 7 by the screw 8, etc. The tip end of the lower end 3b of the terminal 3 is wired to the upper surface of the vibration detecting element 2 by the wire 11. In this state, the lower edge of the terminal holder 4 is fixedly engaged in the step 7f formed along the internal upper edge of the groove 7a of the main metallic mount 7. The soldering for wiring can be performed by inserting the tip of a soldering iron into the groove from the opening 4a formed in the terminal holder 4. The sealing member 15 having O-ring shape is mounted on the main metallic mount 7. Further, the cover member 14 is mounted to cover the terminal holder 5 while the upper end of the terminal 3 is inserted into the terminal passing through-hole 16. Then, the inner face of the cylindrical portion 18a of the main metallic mount 7 guides to mount the cover member 14 thereon. Further, as shown in FIG. 6, the upper end of the cylindrical portion 18a (FIG. 5) is caulked along the stepped face 14b of the cover member 14 to form the caulking/coupling portion 18 to assemble the sensor. During the caulking, the protruding strip 17 of the cover member 14 is pressed to be engaged in the sealing member 6 while the sealing member 15 is compressed between the cover member 14 and the main metallic mount 7 to assure the coupling therebetween.

The sensor 1 thus assembled is attached to the engine block through the screw 7c of the metallic mount 7. The vibration generated owing to knocking in an engine is transmitted to the vibration detecting element 2. The vibration detecting element 2 converts the vibration into an electric signal by the piezoelectric effect and outputs it through the terminal 3.

Figure 7:
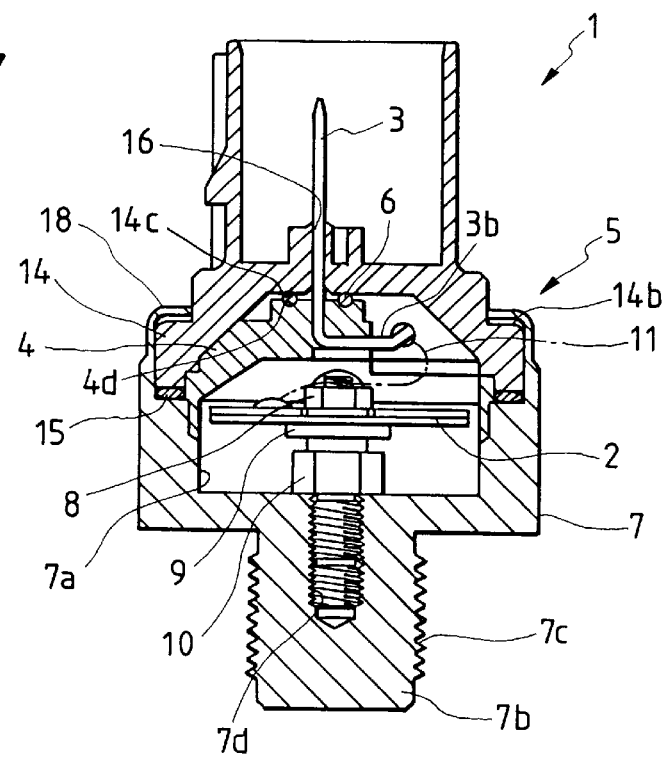
FIG. 7 is a front sectional view showing a modification of the sensor shown in FIG. 1.

Incidentally, if the airtightness at the integral portion between the terminal 3 and the terminal holder 4 can be assured sufficiently, the sealing member 6 may not be integrated with the terminal 3 or the terminal holder 4. For example, as shown in FIG. 7, while the terminal 3 passes through the inside of the O-ring shaped sealing member 6, the sealing member 6 is interposed between the cover member 14 and the terminal holder 4 and compressed to assure the sealing therebetween. In this case, on at least one of the lower surface of the cover member 14 and the upper surface of the terminal holder 4, a groove 14c or/and 4d may be formed for positioning the sealing member 6.

Figure 8:
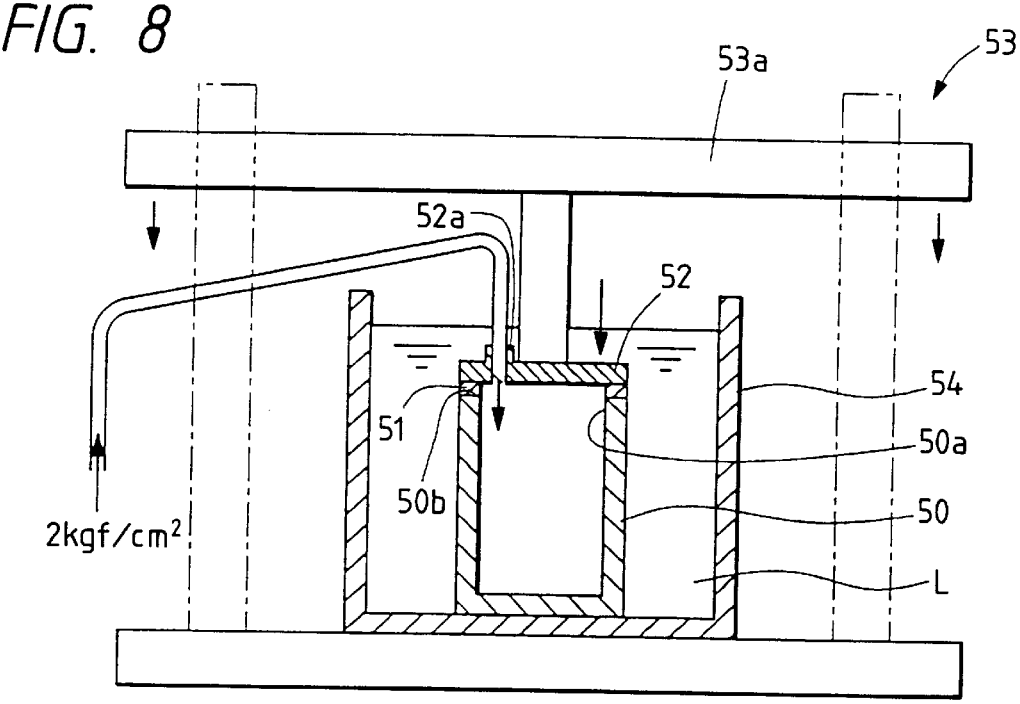
FIG. 8 is a view showing a method of a compression test of rubber material.

An explanation will be given of the test condition for selecting the rubber material used for the sealing member 6. As shown in FIG. 8, a hollow cylinder 50 has one end surface side having an opening portion 50a and the other end surface which is closed. An intervening plate 51 made of rubber and having a thickness of τ0=1 mm is interposed between the hollow cylinder 50 and a shielding member 52 made of steel so that the opening portion is closed. The hollow cylinder 50 has an inner diameter of e.g. 3 mm and an outer diameter of e.g. 4 mm. The plate 51 of rubber is ring-shaped so as to correspond to an opening periphery 50b of the hollow cylinder 50.

Next, while a compression testing machine 53 compresses im the plate 51 between the shielding member 52 and the hollow cylinder 50, air is introduced into the hollow cylinder 50 with pressure of 2kgf/cm$^2$ through an air introducing passage 52a formed in the shielding member 52. An initial compression load is previously set for a relatively large value so that the introduced air does not leak. Thereafter, while a cross head 53a is gradually lifted to lower the compression load, the thickness τc of the rubber plate 51 when the air starts to leak is obtained from the position of the cross head 53 at this time. The plate 51 is compressed in a state where it is immersed in water L together with the hollow cylinder 50 and shielding member 52. Therefore, leak of the air can be visually recognized in accordance with the presence or absence of bubbles.

The compression ratio of the plate 51 at this time, i.e., the minimum compression $C_{min}$ can be calculated by $$C_{min} = (\tau 0 - \tau c)/\tau 0 \qquad (11)$$

On the other hand, in order to measure an upper compression ratio $C_{max}$, the cross head 53a is lowered to increase the compression of the plate 51. The compression ratio when the air starts to leak is the maximum compression ratio $C_{max}$.

Figure 9A:
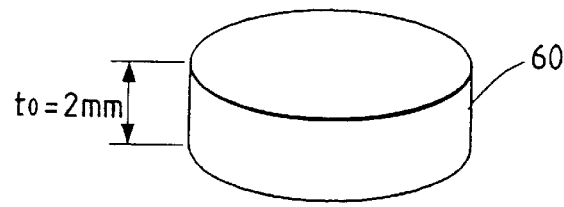
FIGS. 9A and 9B are views showing a method of measuring the compressive permanent distortion coefficient of rubber.
Figure 9B:
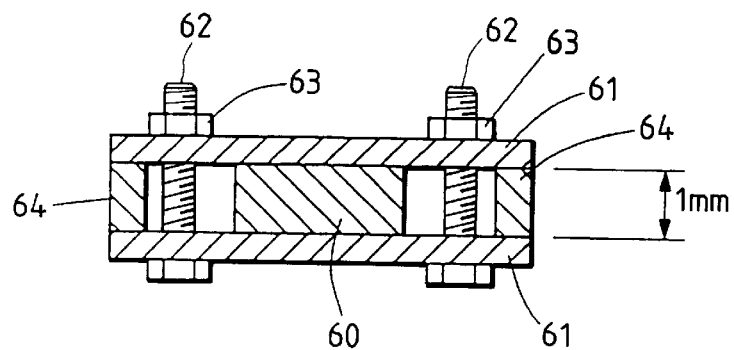

On the compression permanent distortion ratio $R_p$ is measured by the following manner. First, as shown in FIG. 9A, a cylinder 60 of rubber having a thickness of $t_0$ mm is formed. As shown in FIG. 9B, the cylinder 60 is arranged together with a spacer having a thickness of 1 mm between two compressing members 61. Nuts 63 are tightened into bolts 62 penetrating therethrough to compress the cylinder body 60 to the thickness of spacer 64 between both compressing members. In this compressed state, the cylinder 60 is heated to the temperature 130° C. and held for 24 hours as it is. Thereafter, the cylinder 60 is cooled to room temperature, and left for 30 minutes in a state with the compression released. With the thickness of the cylinder 60 at this time being $t_1$, the compression permanent distortion rate $R_p$ is calculated by Formula (2).

It is decided as to whether or not the values of $C_{min}$ and $R_p$ satisfy Formula (10). If the values satisfy the formula (10), the material preferably used as the sealing member 6.

EXAMPLES

Figure 11A:
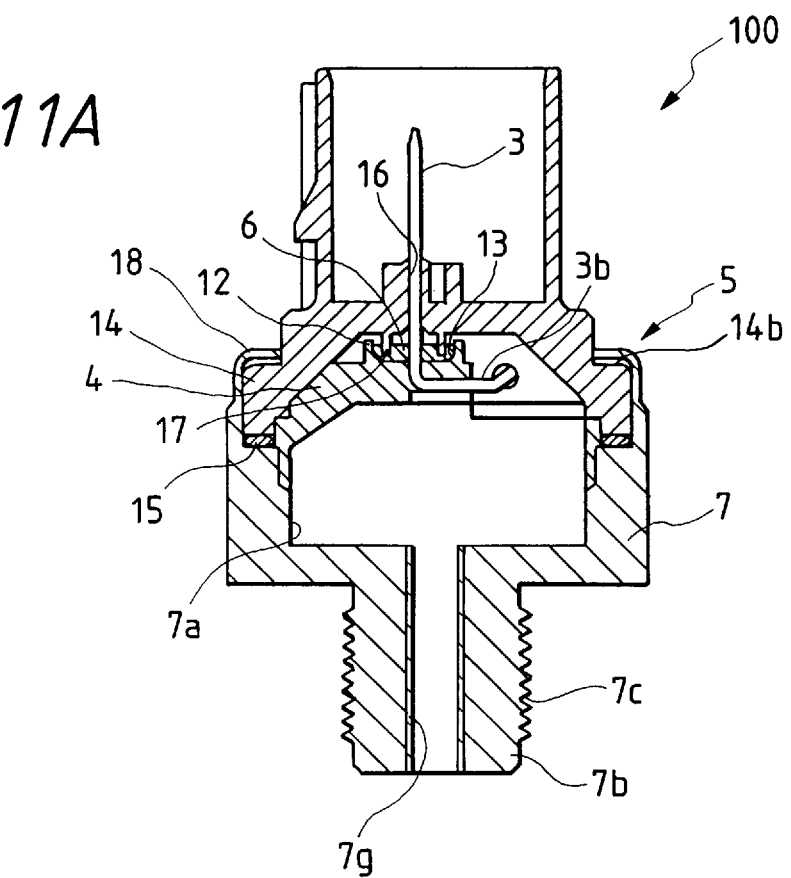
FIGS. 11A and 11B are a sectional view of a testing body used in the embodiment of the present invention and a view showing the method of a verifying test of airtightness.

The minimum compression ratio $C_{min}$, maximum compression ratio $C_{max}$ and compression permanent distortion ratio $R_p$ of various kinds of silicon rubber were measured by the technique described above. Several kinds of sensor samples (hereinafter referred to as "samples") 100 including the seal member 6 made of these rubber materials, as shown in FIG. 11A, were made. These samples 100 have substantially the same structure as that of the sensor 1 of FIG. 1. The vibration detecting element is not mounted in each of these samples. At the attaching portion 7b of the main metallic mount 7 of the sample, a communicating hole 7g is formed which communicates the inside of the groove 7a with the outside of the sample.

Figure 11B:
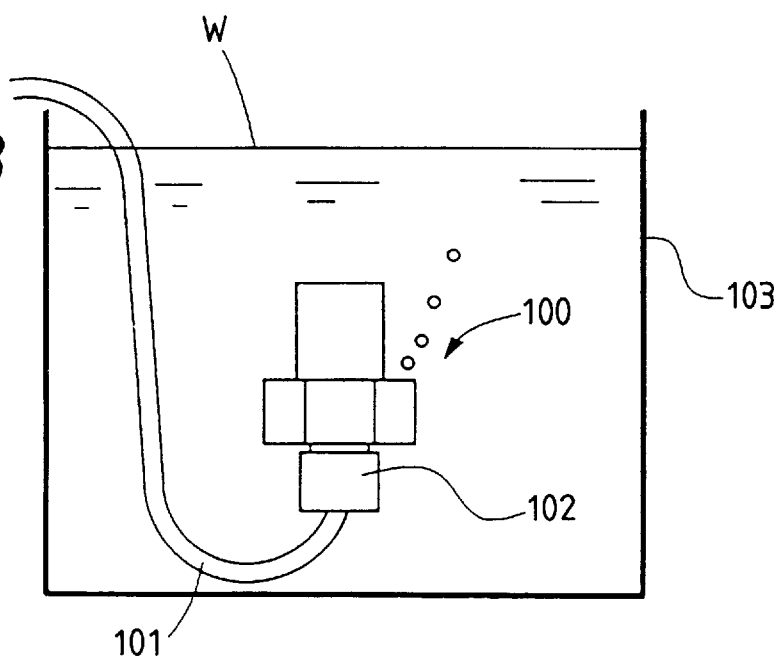

An airtightness recognition test was carried out for each of the samples. As shown in FIG. 11B, an air introducing tube 101 is connected to the attaching portion 7b through the connector portion 102. In this state, the sample 100 is immersed in water W of a water bath 103. Further, air at pressure of 2 kgf/cm² is introduced into the sample 100 through the communicating hole 7g from the air introducing tube 101. Then, presence or absence of leak of air from a portion between a through-hole 16 and a terminal 3 was tested. The sample(s) 100 with no air leak was heated to 130° C. and held for 12 hours. Thereafter, the sample was cooled to room temperature. In this state, the airtightness test was carried out. The sample with no air leak in this state also was held further for 12 hours at 130° C. (24 hours in total) to perform the airtightness recognition test. The test result is shown in Table 1.

TABLE 1

| RUBBER MATERIAL | MINIMUM COMPRESSION RATIO | MAXIMUM COMPRESSION RATIO | COMPRESSIVE PERMANENT DISTORTION RATIO | LEFT SIDE OF FORMULA (1) | |
|---|---|---|---|---|---|
| A | 0.30 | 0.90 | 0.37 | 0.85 | >Cmin |
| B | 0.36 | 0.85 | 0.34 | 0.79 | >Cmin |
| C | 0.32 | 9.84 | 0.37 | 0.77 | >Cmin |
| D | 0.36 | 0.85 | 0.80 | 0.53 | >Cmin |
| E | 0.30 | 0.85 | 0.75 | 0.59 | >Cmin |
| F | 0.32 | 0.90 | 0.78 | 0.58 | >Cmin |
| G | 0.45 | 0.60 | 0.32 | 0.50 | >Cmin |
| H | 0.40 | 0.70 | 0.36 | 0.60 | >Cmin |
| I | 0.34 | 0.53 | 0.38 | 0.41 | >Cmin |
| J | 0.40 | 0.64 | 0.83 | 0.23 | <Cmin |

| RUBBER MATERIAL | LEFT SIDE OF FORMULA (10) | | BEFORE HEATING | AFTER HEATING FOR 12 HOURS | AFTER HEATING FOR 24 HOURS |
|---|---|---|---|---|---|
| A | 0.39 | >Cmin | NO LEAK | NO LEAK | NO LEAK |
| B | 0.40 | >Cmin | NO LEAK | NO LEAK | NO LEAK |
| C | 0.39 | >Cmin | NO LEAK | NO LEAK | NO LEAK |
| D | 0.17 | <Cmin | NO LEAK | NO LEAK | LEAK |
| E | 0.20 | <Cmin | NO LEAK | NO LEAK | LEAK |
| F | 0.18 | <Cmin | NO LEAK | NO LEAK | LEAK |
| G | 0.40 | <Cmin | NO LEAK | NO LEAK | LEAK |
| H | 0.39 | <Cmin | NO LEAK | NO LEAK | LEAK |
| I | 0.38 | >Cmin | LEAK | — | — |
| J | 0.15 | <Cmin | NO LEAK | LEAK | — |

First, the sample I including the rubber material having $C_{max}$ smaller than 0.6 (60%) already exhibited air leak in an initial state. This is probably because the sealing member has been damaged owing to the compression in an assembling stage. On the other hand, the samples with $C_{max}$ larger than 0.6 (60%) endure the heating for 12 hours. Further, the samples using the rubber materials (A–C) satisfying Formula (10) endure the heating for 24 hours.

What is claimed is:

1. A knocking detecting sensor for detecting knocking generated in an internal combustion engine, comprising:

a casing including a first section and a second section having a terminal through-hole, said first and second sections being coupled with each other;

a vibration detecting element for detecting vibrations from knocking and producing an output, said vibration detecting element being securely mounted in said first section;

a terminal holder having a groove portion and placed between said first section and said second section;

a terminal having a first end and a second end, said terminal being inserted through said terminal through-hole, said terminal being disposed through said groove portion and fixedly held by said terminal holder, said first end being connected to said vibration detecting element to receive said output; and a sealing member disposed in said groove portion and integrally formed with said terminal and terminal holder, said sealing member for preventing fluid from entering into said casing through said terminal through-hole.

2. A knocking detecting sensor according to claim 1, wherein said sealing member is a flexible elastic member which is partially compressed between said terminal holder and said casing to form a closed sealing space surrounding said terminal between said sealing member and said terminal holder and said casing.

3. A knocking detecting sensor according to claim 2, wherein said casing has a protruding strip in an inner surface thereof, said protruding strip being formed to surround said terminal through-hole in the inner surface of said casing, and said protruding strip abuts on said elastic member to be engaged thereinto to form said closed sealing space between said protruding strip and said elastic member.

4. A knocking detecting sensor according to claim 2, wherein said flexible elastic member is rubber integrally formed with said terminal, and formed by injecting and hardening fluid non-hardened rubber.

5. A knocking detecting sensor according to claim 4, wherein said groove portion surrounds said terminal on the side opposite to the internal face of said casting, and said sealing member is integrally formed with said terminal and terminal holder by injecting and hardening the fluid non-hardened rubber into said groove portion and fixed.

6. A knocking detecting sensor according to claim 4, wherein said rubber material is silicon rubber.

7. A knocking detecting sensor according to claim 4, wherein in a case where an opening portion is formed on one end surface side of a hollow cylinder whereas the other end surface thereof is closed, the opening portion is closed by a shielding member so that an intervening metal plate made of said rubber is interposed therebetween, and while said rubber plate is compressed at a prescribed compression ratio between the shielding member and the hollow cylinder, air is introduced into the hollow cylinder with pressure of 2kgf/cm$^2$ through an air introducing passage formed in the shielding member or hollow cylinder; said rubber material satisfies the formula of:

$$C_{max}(1-R_p)/(1-C_{max} \times R_p) > C_{min};$$

where $C_{max}$ represents the maximum value of the compression ratio with no air leak, $C_{min}$ represents the minimum value thereof and $R_p$ represents the compression permanent distortion ratio of the rubber.

8. A knocking detecting sensor according to claim 7, wherien said $C_{max}$ is equal to or more than 0.6.

9. A knocking detecting sensor according to claim 7, wherien said $C_{max}$ is equal to or more than 0.8.

10. A knocking detecting sensor according to claim 4, wherein said rubber is one selected from the group consiting of silicon rubber, fluoro rubber, natural rubber, chloroprene rubber and ethylene propylene rubber.

* * * * *

UNITED STATES PATENT AND TRADEMARK OFFICE
CERTIFICATE OF CORRECTION

PATENT NO. : 5,852,234
DATED : December 22, 1998
INVENTOR(S) : Nobuhiro INOUE et al.

It is certified that error appears in the above-indentified patent and that said Letters Patent is hereby corrected as shown below:

Claim 8, Col. 12, line 30, "wherien" should read --wherein--.

Claim 9, Col. 12, line 32, "wherien" should read --wherein--.

Claim 10, Col. 12, line 34, "consiting" should read --consisting--.

Signed and Sealed this

Ninth Day of November, 1999

Attest:

Q. TODD DICKINSON

Attesting Officer    Acting Commissioner of Patents and Trademarks